United States Patent [19]

Auinger et al.

[11] 4,292,559
[45] Sep. 29, 1981

[54] ELECTRIC DRIVE WITH A UNIVERSAL AND INDUCTION MOTOR COMBINED ON A COMMON LAMINATION STACK

[75] Inventors: Herbert Auinger, Nuremberg; Peter Bradler; Rüdolf Weppler, both of Lengfeld; Jaroslav Stepina, Kaiserslautern, all of Fed. Rep. of Germany

[73] Assignee: Siemens Aktiengesellschaft, Berlin and Munich, Fed. Rep. of Germany

[21] Appl. No.: 947,522

[22] Filed: Oct. 2, 1978

[30] Foreign Application Priority Data

Oct. 3, 1977 [DE] Fed. Rep. of Germany ....... 2744472

[51] Int. Cl.³ ............................................. H02K 23/30
[52] U.S. Cl. .................................. 310/206; 310/112; 310/138; 310/166; 310/179; 310/234
[58] Field of Search ................ 310/179, 112, 158–160, 310/136–142, 166, 180, 182, 184, 173, 183, 174, 175, 198, 200–210, 233, 234, 114, 134, 133; 318/111–113; 322/90

[56] References Cited

U.S. PATENT DOCUMENTS

| 1,335,110 | 3/1920 | Hellmund | 318/111 |
| 1,922,810 | 8/1933 | Hull | 310/173 |
| 3,146,387 | 8/1964 | Levy | 318/112 |
| 3,403,313 | 9/1968 | Pansini | 310/112 |
| 3,733,506 | 5/1973 | Jaffe | 310/198 |
| 3,930,175 | 12/1975 | Chirgwin | 310/170 |
| 4,074,160 | 2/1978 | Broadway | 310/197 |

FOREIGN PATENT DOCUMENTS 2530294 1/1977 Fed. Rep. of Germany ...... 310/112

Primary Examiner—R. Skudy
Attorney, Agent, or Firm—Kenyon & Kenyon

[57] ABSTRACT

In an induction and universal motor combined in a common lamination stack and supplied from a single phase line in line with a single armature winding system common to universal commutator motor as well as to induction motor operation, there are connected to the same segments of the commutator a crossed lap winding and an uncrossed lap winding, the coil span of which corresponds approximately to one pole pitch of the low pole and, in particular, two pole commutator stator winding and to an uneven integral multiple of the high pole induction motor stator winding, to provide a motor particularly suited for driving automatic washing machines.

10 Claims, 21 Drawing Figures

| 2p = 4/2 |
| --- |
| N = 12 |
| W = 1-5 |
| L = 24 |
| s = 1-2 |

| 2p = 6/2 |
| --- |
| N = 18 |
| W = 1-10 |
| L = 36 |
| s = 1-2 |

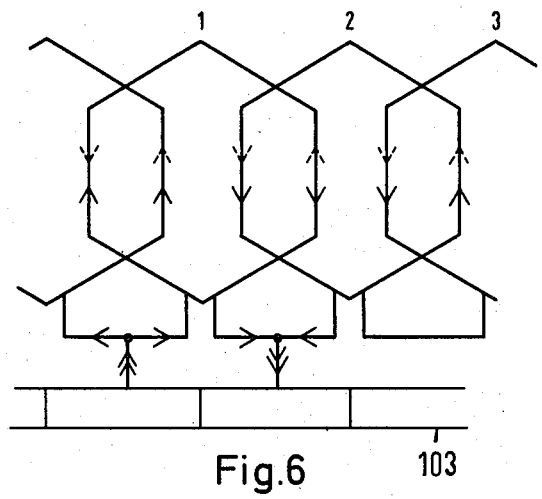
Fig.6    103
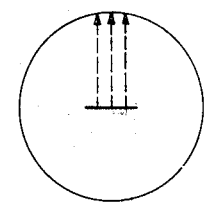
Fig.7
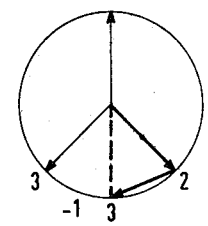
Fig.8
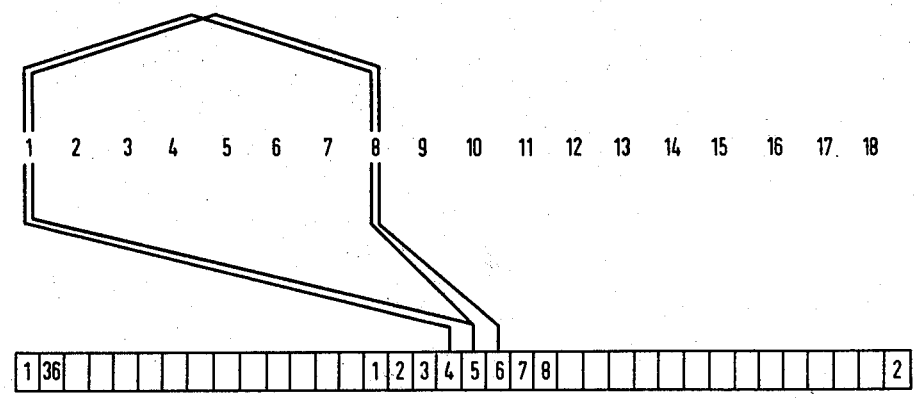
Fig.9a
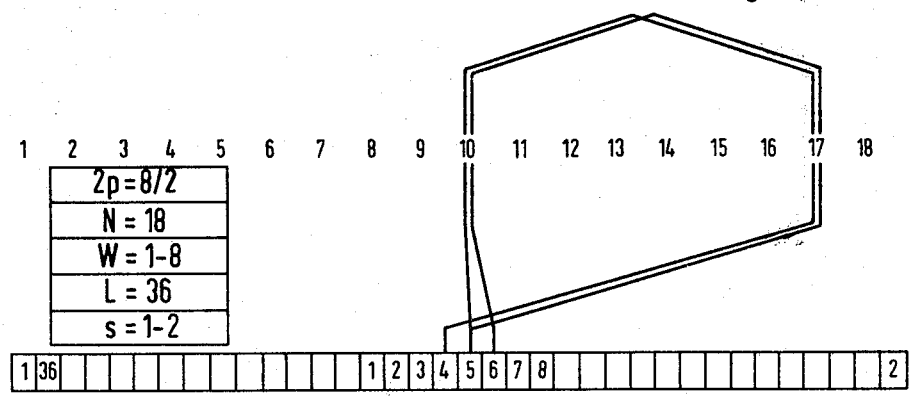
Fig.9b 2p=8/2
N=24
W=1-10
L=24
s=1-2

2p=8/2
N=20
W=1-8
L=20
s=1-2

ELECTRIC DRIVE WITH A UNIVERSAL AND INDUCTION MOTOR COMBINED ON A COMMON LAMINATION STACK

BACKGROUND OF THE INVENTION

This invention relates to an electric drive with two motors on a common lamination stack, each motor of which can be connected separately to a single phase A.C. line serving as the only supply source, in general and more particularly to an improved drive of this nature.

Drives of this type which include a stator winding of a commutator motor which has a small number of poles (lower pole number) on the one hand and of an induction motor which has a larger number of poles (higher pole number), on the other hand, arranged in a common stator lamination stack are known. Such drives include a common armature wound in such a manner that, for operation as an induction motor, short circuits with a number of poles corresponding to that of the exciting induction motor stator field are formed from series connected coils in each phase winding, and that, for commutator motor operation, circuits with a number of poles corresponding to the exciting commutator stator field are formed via the segments of a commutator. Hereinafter this type of drive will be referred to as a two motor drive.

In one known two motor drive of this type (German Offenlegungsschrift No. 25 30 294), the stator lamination stack is slotted over the entire circumference; a 12 pole, 3 phase stator winding of an induction motor and a winding of a 2 pole commutator motor, provided as an A.C. series motor, are arranged in common respective slots. A stator lamination cut with unequal slot cross section is chosen and the winding of the induction motor is distrubuted uniformly over all slots, while the winding of the series motor only partially occupies slots which, for this purpose, have a larger slot cross section than the other slots which are occupied only by the winding of the induction motor. Both a 2 pole armature winding for the series motor, connected to the segments of a commutator, and a 2 phase wound induction motor winding, completely insulated from the former, with a number of poles corresponding to the number of poles of the induction motor winding of the stator, are provided in the rotor. The coils or groups of coils of the 2 phase induction motor winding are connected in series in each phase and form short circuits due to the beginning and the end of the series circuit being joined together.

In another known two motor drive (Swiss Pat. No. 17 611) with a D.C. motor and an A.C. motor comprising an induction motor winding connected to the commutator and a D.C. wave winding, the drive, which can be used mainly as a rotary converter, is always operated simultaneously with A.C. and D.C.

SUMMARY OF THE INVENTION

It is an object of the present invention to make the two motor drive mentioned at the outset less noisy, particularly with respect to possible magnetic noise, without additional fabrication and material costs. Such requirements are of importance particularly if such a drive is used for automatic washing machines.

According to the present invention, the stated problem is solved in an electric two motor drive of the type mentioned at the outset by connecting, in a common single armature winding system provided for commutator motor as well as for induction motor operation, a uncrossed lap winding and a crossed lap winding, the coil span of which always corresponds approximately to one pole pitch of the lower pole number, especially a two pole commutator stator winding, and to an uneven integral multiple of the multi-pole induction motor stator winding, to the same segments of the commutator. It is thereby achieved that, in a manner advantageous from the point of view of fabrication as well as of the winding technique, without switching any rotor winding parts and while fully utilizing the same total copper in the winding, the rotor winding, seen as a commutator winding connected in a definite manner reacts, on the one hand, to the excited, multi-pole stator field of the induction motor like a closed, torque forming multi phase winding, and on the other hand, if current flows in the brushes of the commutator and the stator field of the commutator is excited, it works as a commutator lap winding at the latter's different, small number of poles, without the occurrence of oversynchronous braking torques due to the rotor phase windings, at speeds above the synchronous speed of the multi-pole induction motor, inasmuch as the voltages formed in the above-described multi-pole short circuits by the lower pole number field add up to zero.

If a pole number ratio of 4:2 or 8:2 or 12:2 or 16:2 is provided for the electric two motor drive according to the present invention, then it is advantageous to connect the beginning and the end, respectively, of a coil of the uncrossed, as well the beginning and end of a coil of the crossed lap winding, which coil is arranged spatially displaced by 180° at the beginning relative to this coil, to each two adjacent segments of the commutator. If a pole number ratio of 6:2 is provided, then it is advantageous to connect the beginning and end of a series circuit, otherwise not connected to the commutator, of two coils, which are displaced 120° relative to each other and are to be associated (crossed) with the crossed lap winding, as well as a coil, displaced at the circumference by another 120° in the interest of uniform distribution, of the other, uncrossed lap winding, to two adjacent respective segments of the commutator.

An embodiment which is advantageous particularly with respect to low developed noise, is characterized by the feature that, with the number of slots in the stator and armature winding different, as known per se, the number of slots in the armature is different from the customary number of slots of the armature, which can be determined on the basis of the number of poles, the number of phases and the number of slots per pole and phase winding. An application of the invention, which is particularly advantageous due to the lack of noise developed with the given compact dimensions, is in a drive for an automatic washing machine, in which the induction motor is provided for the washing cycle and the commutator motor, as a series universal motor, for the spinning cycle.

BRIEF DESCRIPTION OF THE DRAWINGS

FIG. 6 illustrates the principle of a winding plan of the winding of FIG. 5.

FIG. 7 and FIG. 8 are voltage vector diagrams for the multi-pole (high pole number) and the lower pole number operation of the drive motor according to FIGS. 5 and 6 respectively.

FIGS. 9a and b is the winding plan of the integrated rotor winding of an 8/2 pole changeable drive motor with 18 rotor slots and 36 commutator segments.

DETAILED DESCRIPTION OF THE INVENTION

Figure 1:
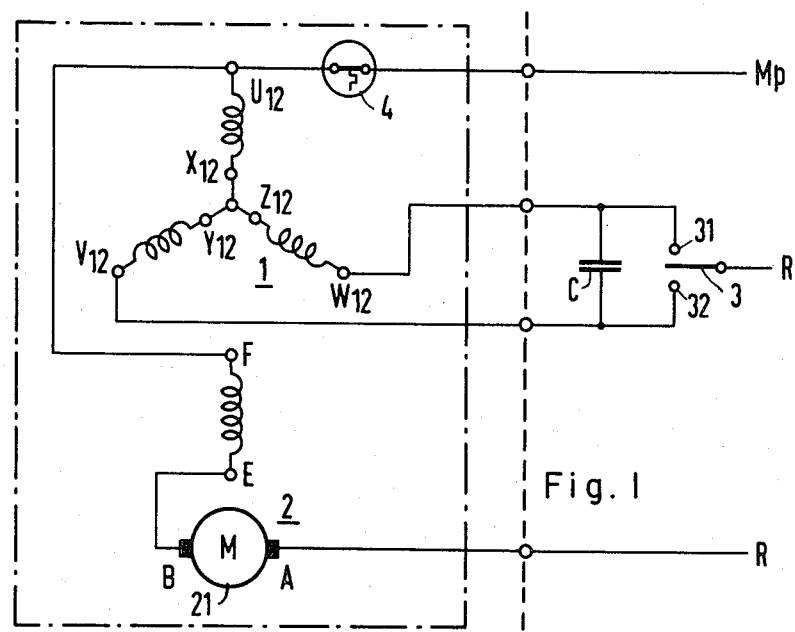
FIG. 1 is the basic circuit diagram for an automatic washing machine drive with a three phase induction motor part and a universal motor part arranged in the same lamination stack.

FIG. 1 shows, in a dashed-dotted frame, the integrated induction and universal motor, which is supplied from a single phase line with sides R and $M_p$. The three Y-connected phase windings of the induction motor 1 are connected between respective terminals U12–X12, V12–Y12, W12–Z12. The field winding of the series universal motor 2, supplied from the single phase A.C. line has its end terminals designated as E and F. The brushes of the corresponding rotor 21 are designated, as B and A. In parallel to the terminals V12 and W12, respectively, the two contacts 31 and 32 of a reversing switch 3 are connected. The input terminal of switch 3 is connected to the side R of the supplying single phase line. A capacitor C is connected in parallel with the terminals 31 and 32 in a manner known per se. The second side $M_p$ of the supplying single phase line is connected in series, via a thermal monitor 4, to the input terminal U12 of the induction motor, which may be designed, for instance, with 12 poles and which drives, via a belt transmission, the washing drum of an automatic washing machine during washing operation at about 50 RPM at the drum. The induction motor can be also designed with only two phase windings instead of the three phase windings shown here. The number of poles of the universal (commutator) motor is to be, for instance, equal to 2, but can be basically be any number. However, it must have a magnitude different from the number of poles of the induction motor 1 if, in a particularly advantageous manner, and without additional switching and interrupting means for the current supply of the induction motor overall, no oversynchronous braking torque of the induction motor is to occur when the commutator series motor is operated at a speed which is above the synchronous speed of the induction motor.

Figure 2A:
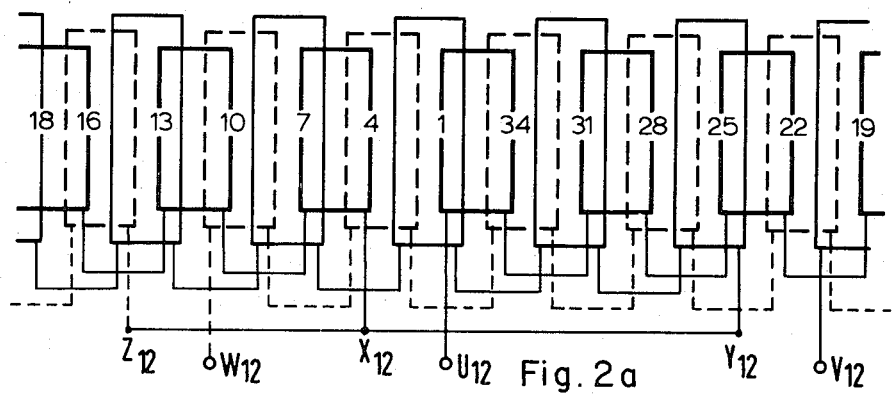
FIGS. 2a and b is the winding plan for the stator winding for a 12 pole, 3 phase winding induction motor part and for a 2 pole universal motor part arranged in the same stator lamination stack.
Figure 2B:
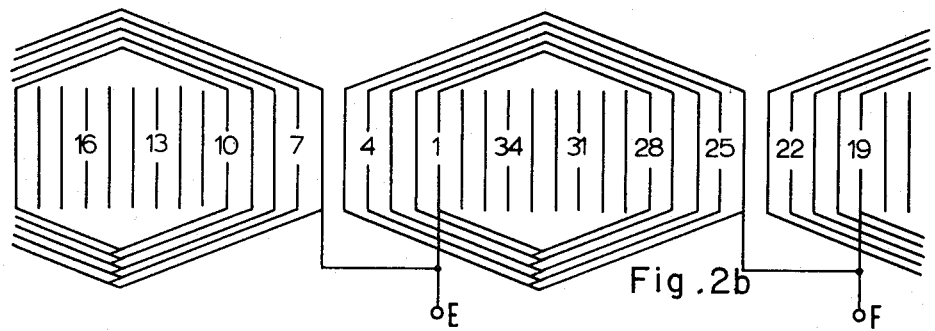
Figure 13A:
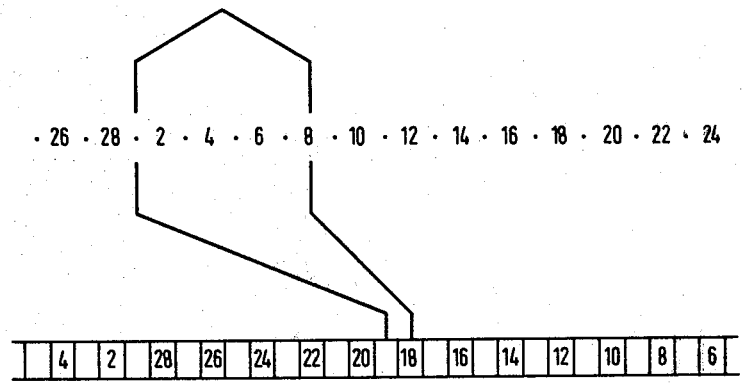
FIGS. 13a and b is the winding plan of the integrated rotor winding of a 12/2 pole changeable drive motor with 28 rotor slots and 28 commutator segments.
Figure 13B:
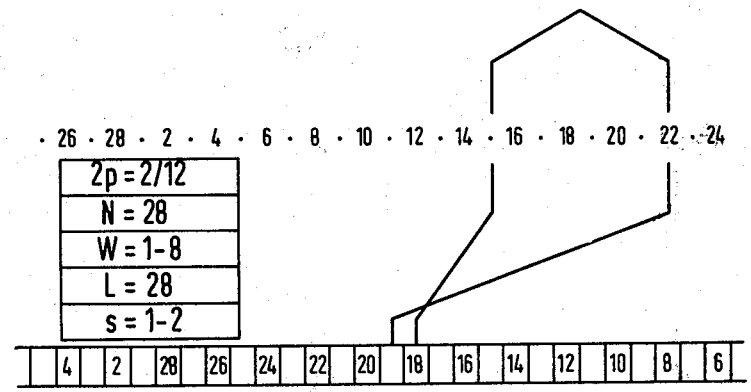

The upper part of FIG. 2 shows the winding plan of the stator winding, shown in principle in FIG. 1, of a 12 pole, 3 phase winding induction motor 1. The lower part of the figure shows the winding plan of the 2 pole universal motor arranged in the same lamination stack. Such a stator winding, consisting of the two winding parts mentioned can be used for a drive motor according to the present invention. The integrated rotor winding of such a motor, i.e., a winding which is used for induction motor operation, on the one hand, as well as for commutator motor operation, on the other hand, without switching and with full utilization of the copper of the windings, is shown in FIG. 13.

Figure 3A:
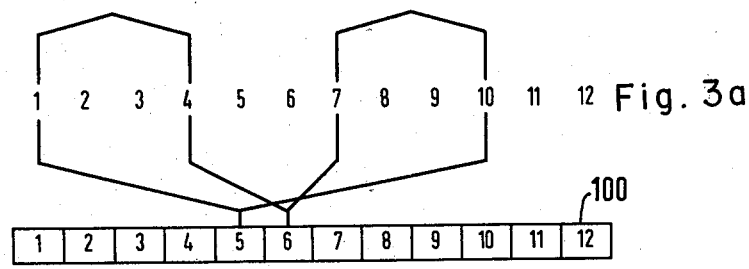
FIGS. 3a and b illustrate the principle of a winding plan of an integrated rotor winding for a 4/2 pole changeable drive motor with 12 commutator segments.
Figure 3B:
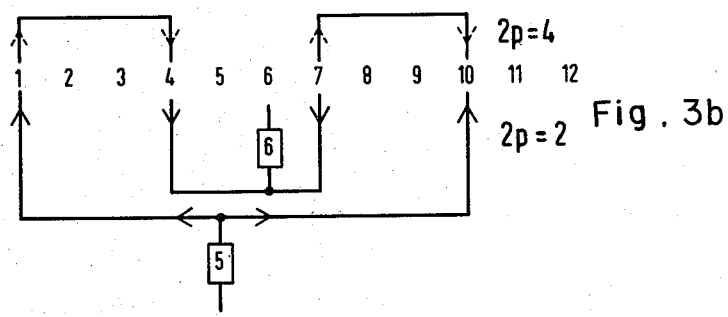

FIG. 3 shows two rotor or armature windings connected to the same segments 5 and 6 of a developed commutator 100 which is equipped with a total of 12 segments, with the left winding which occupies slots 1 and 4 of the rotor being realized as an uncrossed lap winding and the right coil, which occupies slots 7 and 10, as a crossed lap winding. The two coils are displaced in space 180° along the circumference of the rotor. Due to the arrangement of the coils according to the present invention, as shown in FIG. 3, with the coil spans provided in accordance with the present invention, i.e., with a coil span which always corresponds to approximately one pole pitch of the lower pole number and to an uneven integral multiple of the higher pole number, the excitation directions which are shown particularly well in the tutorially clearer presentation of the winding plan in the lower part of FIG. 3 for 4 pole operation (dashed-dotted direction arrows) as well as for 2 pole operation (solid direction arrows) result.

Figure 4A:
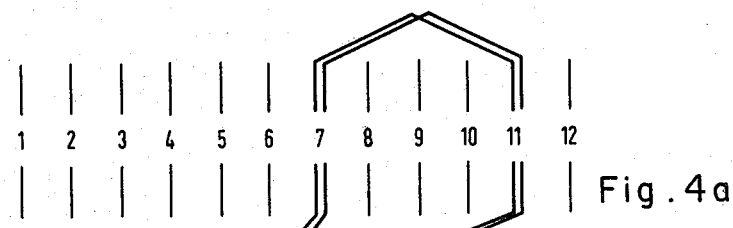
FIGS. 4a and b is the winding plan of the integrated rotor winding for a 4/2 pole changeable drive motor with 24 segments.
Figure 4:
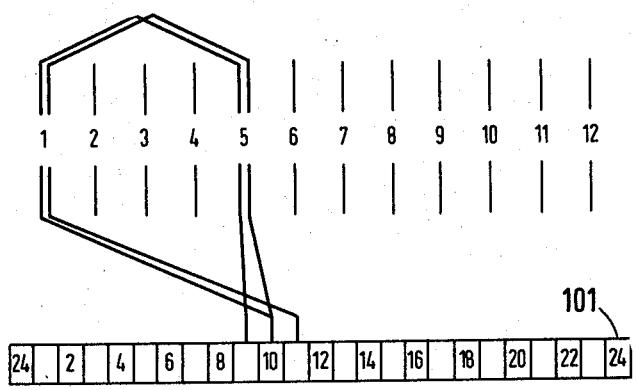

FIG. 4 shows the winding plan of a 4/2 pole changeable drive motor according to the present invention with a commutator pole pair number $p_k=1$ with a total of 12 rotor slots and 24 commutator segments. For clarification, the commutator 101 is shown in the upper as well as in the lower half of the figure and only one of the two windings (crossed and uncrossed, respectively) is shown in each individual drawing. In line with a reduction of the commutator segment voltage, each coil is divided correspondingly into sub coils so that two subcoils are provided per slot as is evident from the coil shown in heavy solid lines (slots 7, 11 and 1, 5, respectively), which are brought to two adjacent segments and are connected in series. As compared to the winding plan of FIG. 3, there are twice the number of segments for the same number of slots. The present winding, constructed according to the present invention as far as the coil span and the connection to the commutator is concerned, again represents the integration of a crossed (lower development) and a uncrossed (upper development) conventional lap winding; in 2 pole commutator operation (lower pole number), the one winding works in parallel with the other without interference and, at the higher pole number (2p=4) results, together with the other, in short circuits. The thus integrated winding acts, in 2 pole commutator operation, like a normal lap winding with twice the number of parallel branches and at the higher, asynchronous pole number, without any switching actions whatever, as if all coils were short-circuited. Braking torques do not occur in the oversynchronous region (as referred to the induction motor).

FIG. 5 again shows, in a two fold development, on one and the same rotor winding with one and the same commutator 103, the integrated winding of a 6/2 pole changeable drive motor with 18 slots and 36 rotor segments. In the upper part, shown as an example of the entire winding system, is a coil which is arranged at the rotor circumference in accordance with the present invention as to the coil span, and which occupies the slots 1 and 10 with two coil sides each and is accordingly divided into two subcoils. In the lower part the series circuit according to the present invention, of a second coil which occupies slots 7 and 16 and an additional coil occupying slots 13 and 4 is shown. The beginning and the end of the series circuit, connected as a crossed coil, are connected to the same segments 18, 19 and 20 as the ends of the uncrossed winding in the upper part of the illustration. The three coils are distributed at the circumference in line with the excitation required for a 6/2 pole changeable drive motor, according to the present invention, with a spacing of 120° each along the circumference and with the coil span provided in accordance with the present invention.

Figure 5A:
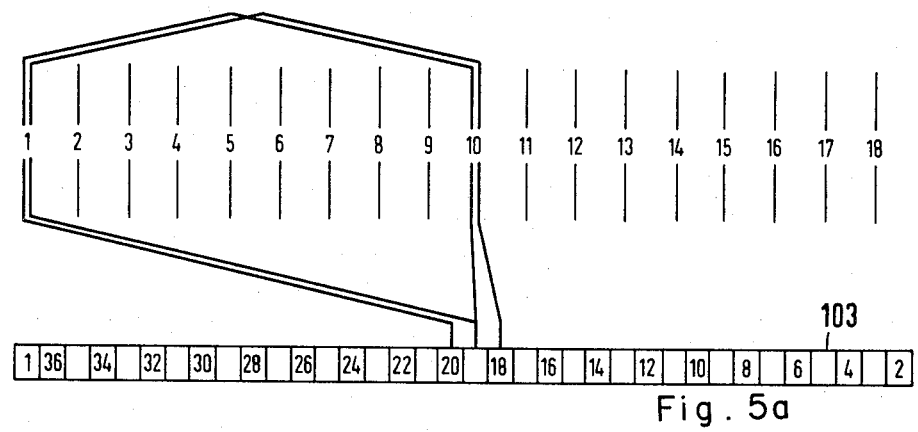
FIGS. 5a and b is the winding plan of the integrated rotor winding for a 6/2 pole changeable drive motor with 36 segments.
Figure 5B:
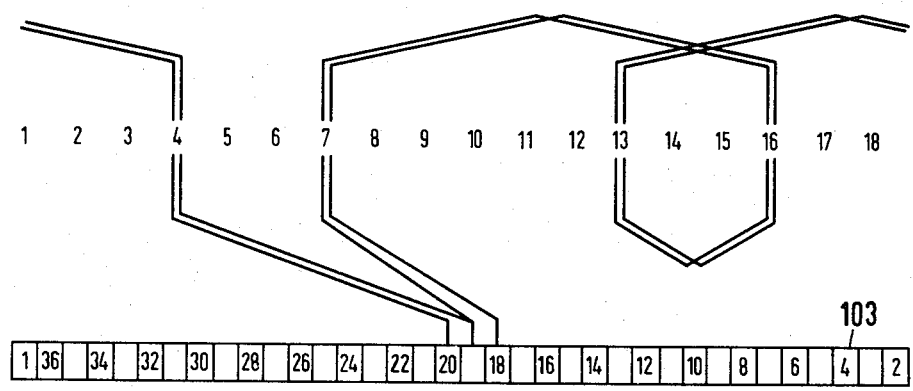

FIG. 6 shows, in a tutorially clearer form, the three individual coils, shown as a section in FIG. 5, with the respective excitations for 2 pole (solid current arrows) and 6 pole (dashed-dotted current arrows) operation.

FIGS. 7 and 8 show the corresponding voltage vector diagrams for 6 pole and 2 pole operation. The three coils which are arranged from left to right in FIG. 6, displaced in space 120° at the circumference and delta connected in the same sense, form a short circuit in 6 pole operation. If this system is fed at two points of the triangle, a 2 pole field is obtained. The series circuit of the two right-hand coils is then connected in shunt to the first coil. Because of the coil displacement in space, the two parallel paths are equivalent, with regard to the voltage induced, when 2 p=2. From such winding elements which advance from slot to slot and are uniformly distributed over the circumference, completely symmetrical commutator windings can be constructed.

Figure 11A:
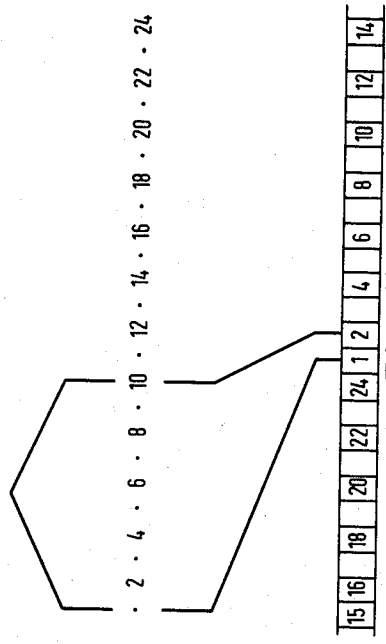
FIGS. 11a and b is the winding plan of the integrated rotor winding of an 8/2 pole changeable drive motor with 24 rotor slots and 24 commutator segments.
Figure 11B:
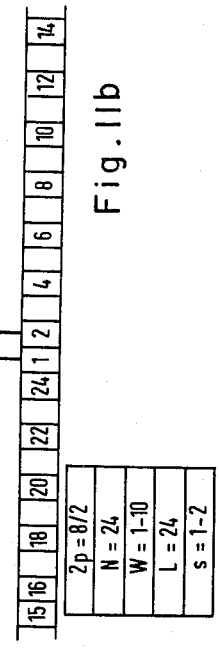
Figure 10A:
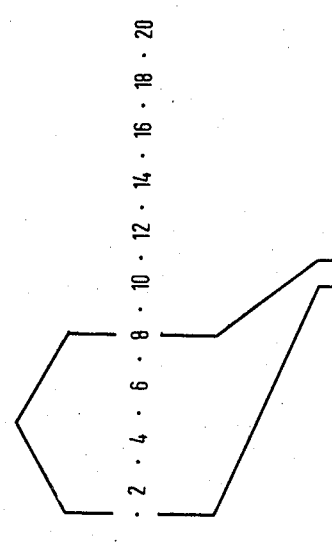
FIGS. 10a and b is the winding plan of the integrated rotor winding of an 8/2 pole changeable drive motor with 20 rotor slots and 20 commutator segments.
Figure 10B:
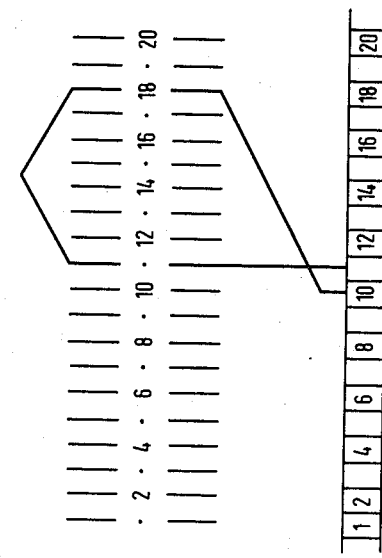

FIGS. 9, 10 and 11 again show the respective basic design of the winding plan of an 8/2 pole changeable winding, in the diagrammatical presentation already used previously, with an uncrossed coil shown in the respective upper part of the figure and the associated crossed coil shown in the lower part of the figure as an example of the overall integrated rotor winding system. FIG. 9 shows a winding with 18 slots and 36 commutator segments. Each coil is subdivided into two subcoils. In FIG. 10 a winding with 20 slots and 20 commutator segments, respectively, where no subdivision of the coils into subcoils is shown. A winding with 24 rotor slots with 24 commutator segments is shown in FIG. 11. The winding plan of a 12/2 pole changeable drive motor with 28 rotor slots and 28 commutator segments is illustrated by FIG. 13. As can be seen, for instance, from FIG. 13, it is advantageously provided, in view of low magnetic noise, that, with a different number of slots in the stator and armature windings, as known per se, the number of slots in the armature ($N_2=28$) is different from the customary number of slots of the armature ($N_2=24$) which can be determined on the basis of the number of poles, the number of phases and the number of slots per pole per phase using the equation $N_2 = 2p \cdot m_2 \cdot q_2$.

Figure 12:
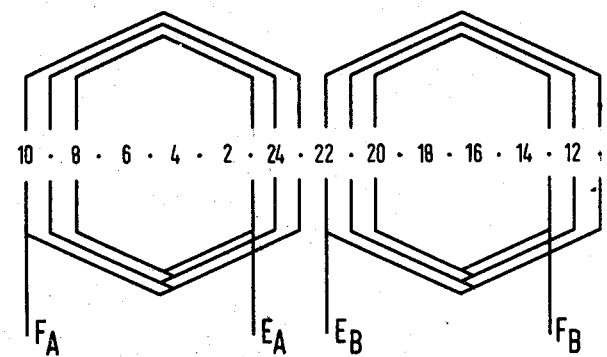
FIG. 12 is the winding plan of a lower pole number stator winding provided for 6/2 and 8/2 pole changeable operation.

FIG. 12 shows the 2 pole stator winding of the stator, provided with 24 slots, of an 8/2 or 6/2 pole changeable drive motor according to the present invention. The stator winding shown in FIG. 12 results in a three phase winding design for the 8/2 pole changeable motor and a 2 phase winding design for the 6/2 pole changeable motor.

The lap windings provided in the rotor according to the present invention, which are always arranged in pairs crossed on the one hand and uncrossed on the other hand, can be implemented as clockwise or counterclockwise lap windings, respectively.

What is claimed is:

1. In an electric two motor drive including means for separately connecting each motor to a single phase AC line service as the only supply source comprising a stator winding of a commutator motor having a lower pole number and a stator winding of an induction motor having a higher pole number arranged in the common stator lamination stack, and a common armature which forms short circuits to give a number of poles corresponding to a higher pole number of the exciting induction motor stator field from series connected coils in each phase winding and a segmented commutator, the segments of which form circuits with a number of poles corresponding to the lower pole number of the exciting commutator stator field the improvement comprising a common single armature winding system provided for the commutator as well as the induction motor operation, said winding having an uncrossed lap winding and a crossed lap winding connected to the same segments of the commutator, the coil span of said windings corresponding respectively at least approximately to one pole pitch of the lower pole number commutator stator winding and to an uneven integral multiple of the pole pitch of the higher pole number induction stator winding.

2. The improvement according to claim 1 wherein said stator winding of a commutator motor is a two pole commutator motor stator winding.

3. The improvement according to claim 1 wherein the ratio of said higher pole number to said lower pole number is 4:2 or 8:2 or 12:2 or 16:2 and wherein the beginning and the end of a coil of the uncrossed lap winding as well as the beginning and end of a coil, shifted in space 180° relative to the latter at the armature circumference, of the crossed lap winding are connected to each two respective adjacent segments of the commutator.

4. The improvement according to claim 1 wherein the ratio of said higher pole number to said lower pole number is 6:2 and wherein the beginning and the end of a series circuit, otherwise not connected to the commutator, of two coils which are displaced 120° relative to each other at the armature circumference and are associated with the crossed lap winding as well as the beginning and end of a coil, displaced by another 120° at the circumference, in the interest of uniform distribution, of the uncrossed lap winding are connected to each two respective adjacent segments of the commutator.

5. The improvement according to claim 1 wherein with a different number of slots in the stator and armature windings, the number of slots $N_2$ in the armature is different from the customary number of slots as determined by the number of poles, the number of phases and the number of slots per pole per phase through the equation $N_2 = 2p \cdot n_2 \cdot q_2$ where p is equal to the number of poles $n_2$ the number of phases and $q_2$ the number of slots per pole per phase.

6. The improvement according to claim 5, wherein the number of slots in the armature is even.

7. The improvement according to claim 5 wherein for a 4/2 pole changeable drive with a two phase winding induction motor stator winding with $N_1 = 16$ slots, 10 or 14 slots, respectively, are provided in the rotor.

8. The improvement according to claim 4 wherein for an 8/2 pole changeable drive with a 3 phase winding induction motor stator winding with $N_1 = 24$ slots, 18 slots are provided in the rotor.

9. The improvement according to claim 1 wherein with a 12/2 pole changeable drive with a 3 phase winding induction motor stator winding with $N_1 = 36$ slots, 28 slots are provided in the rotor.

10. The improvement according to claim 1 for use as a drive for an automatic washing machine, in which the induction motor is provided for the washing cycle and the commutator motor, as a series universal motor, for the spinning cycle.

* * * * *